United States Patent
Rao et al.

(10) Patent No.: US 10,597,509 B2
(45) Date of Patent: Mar. 24, 2020

(54) SUPPORTED CATALYST WITH IMPROVED FLOWABILITY

(71) Applicant: Univation Technologies, LLC, Houston, TX (US)

(72) Inventors: Yuanqiao Rao, Lake Jackson, TX (US); Ping Cai, Lake Jackson, TX (US); Kevin J. Cann, Rocky Hill, NJ (US); F. David Hussein, Cross Lanes, WV (US); Wesley R. Mariott, Pearland, TX (US); Phuong A. Cao, Old Bridge, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 16/357,787

(22) Filed: Mar. 19, 2019

(65) Prior Publication Data

US 2019/0211181 A1 Jul. 11, 2019

Related U.S. Application Data

(62) Division of application No. 14/653,746, filed as application No. PCT/US2013/078193 on Dec. 30, 2013, now Pat. No. 10,280,283.

(60) Provisional application No. 61/746,664, filed on Dec. 28, 2012.

(51) Int. Cl.
| | |
|---|---|
| *C08F 4/02* | (2006.01) |
| *C08K 3/36* | (2006.01) |
| *B01J 21/06* | (2006.01) |
| *B01J 21/08* | (2006.01) |
| *B01J 21/18* | (2006.01) |
| *B01J 35/00* | (2006.01) |
| *B01J 37/02* | (2006.01) |
| *C08F 10/00* | (2006.01) |
| *C08F 4/659* | (2006.01) |
| *C08F 110/02* | (2006.01) |
| *C08F 4/6592* | (2006.01) |

(52) U.S. Cl.
CPC .............. *C08K 3/36* (2013.01); *B01J 21/08* (2013.01); *B01J 37/0211* (2013.01); *B01J 21/06* (2013.01); *B01J 21/18* (2013.01); *B01J 35/0013* (2013.01); *B01J 35/0033* (2013.01); *B01J 37/0203* (2013.01); *C08F 4/65912* (2013.01); *C08F 4/65927* (2013.01); *C08F 110/02* (2013.01); *C08F 2410/01* (2013.01)

(58) Field of Classification Search
CPC ........ B01J 21/08; B01J 37/0211; B01J 21/16; B01J 21/18; B01J 35/0013; B01J 35/0033; B01J 35/0203
USPC .......................................................... 524/847
See application file for complete search history.

(56) References Cited

U.S. PATENT DOCUMENTS

| | | |
|---|---|---|
| 4,666,998 A | 5/1987 | Hagerty |
| 5,276,113 A | 1/1994 | Hashiguchi et al. |
| 7,341,976 B2 | 3/2008 | Espinoza et al. |
| 7,923,615 B2 * | 4/2011 | Silvy ............... B01J 23/002 423/594.1 |
| 2006/0094593 A1 | 5/2006 | Beech et al. |
| 2012/0198769 A1 | 8/2012 | Schirrmeister et al. |

FOREIGN PATENT DOCUMENTS

| | | |
|---|---|---|
| JP | 2002370037 | 12/2002 |
| JP | 2007157646 | 6/2007 |
| JP | 2007157646 A * | 6/2007 |

\* cited by examiner

*Primary Examiner* — Kelechi C Egwim
(74) *Attorney, Agent, or Firm* — Brooks, Cameron & Huebsch, PLLC

(57) ABSTRACT

Catalyst systems and methods for making and using the same are provided. The catalyst system can include a catalyst support, wherein the catalyst support has an average particle size of about 2 microns to about 200 microns. Nanoparticles are adhered to the catalyst support, wherein the nanoparticles have an average particle size of about 2 to about 200 nanometers. A catalyst is supported on the catalyst support.

8 Claims, No Drawings ns/US2013/078193, filed Dec. 30, 2013 and
SUPPORTED CATALYST WITH IMPROVED FLOWABILITY This application is a Divisional of U.S. National Stage application Ser. No. 14/653,746, filed Jun. 18, 2015 and published as U.S. Publication No. 2015-0344667 A1 on Dec. 3, 2015, which is a US § 371 of International Application Number PCT/US2013/078193, filed Dec. 30, 2013 and published as WO 2014/106143 on Jul. 3, 2014, which claims the benefit to U.S. Provisional Application 61/746,664, filed Dec. 28, 2012, the entire contents of which are incorporated herein by reference in its entirety.

BACKGROUND

Gas-phase polymerization has been recognized as one of the most economical methods of manufacturing various polyolefin products. Major polyolefin products include polyethylene and polypropylene. Processes of manufacturing polyolefin products include the UNIPOL™ Polyethylene Process of Univation Technologies LLP, and the UNIPOL™ Polypropylene Process of the Union Carbide Corporation, which is a wholly owned subsidiary of the Dow Chemical Company. In gas-phase processes generally, a high-activity catalyst is usually fed into a fluidized-bed reactor in the form of very small particles, either in the form of dry powder catalyst, or in the form of slurry catalyst, e.g., solid catalyst in liquid medium such as mineral oil. In the reactor, monomer and co-monomer(s) are converted to polymer that grows on the catalyst particles. When the polymer product particles are discharged from the reactor, the quantity of the catalyst in the product is so small that no catalyst separation is needed. Because of the nature of such gas-phase processes, sizes of the catalyst particles are often kept small, which places the catalyst particles in the Group C powder of the Geldart's particle classification (Powder Technol. Vol. 7, p. 285, (1973)), e.g., between a few to about 200 microns.

A problem associated with a Geldart's Group C powder is the cohesiveness of the powder resulting from strong inter-particle forces, such as electrostatic forces, van der Waals forces, and the like. Accordingly, achieving a uniform distribution of the catalyst in a gas-phase reactor may be problematic. If the distribution of fresh catalyst particles in the reactor is not uniform, some local catalyst-rich spots in the reactor may be formed. As a result, excessive polymerization heat can be generated at those spots, resulting in over-heating and the melting of the polymer at those locations. When the problem is severe, large-size polymer agglomerates and even polymer "chunks" and/or "sheets" can be formed, potentially blocking the product-discharge port. As a result, the reactor may have to be shut down for cleaning, which increases costs due to loss of reactor production time, cleaning costs, and startup costs.

Further, when fed in the form of dry powder catalyst, cohesion of the catalyst may complicate maintaining a stable solid-catalyst flow rate (or feeding rate) and accurately measuring the catalyst flow-rate. That can further affect the stable operation of the reactor. In addition, maintaining a relatively high flow rate of a cohesive dry catalyst may require multiple catalyst feeders in large size reactors, which increases the investment and operational cost of the reactor system.

Commercially, different methods have been adopted to fight the problem of cohesive catalyst powder. One common method is to make a slurry of catalyst with an inert liquid, such as mineral oil or a paraffinic solvent, so the accurate feeding measurement and control would be less of a problem. However, the catalyst distribution inside a reactor may still be uneven with the slurry catalyst, because the inert liquid might be quickly separated from the catalyst particles after feeding into the reactor, via contacting with numerous vigorously moving particles inside the reactor. The slurry catalyst feed has its own advantages and disadvantages, such as requiring additional slurry-making equipment and procedure, impact on catalyst kinetics, and the like. Thus, dry feed systems for adding catalyst particles directly into the fluidized bed are still commonly used. Different carrier gases, e.g., nitrogen or ethylene, and different flow-rates have been employed for dry-catalyst feeding. However, the problem of hot spots forming in the reactor due to uneven catalyst mixing has not been completely solved.

In the gas-phase polymerization reactor, induced electrostatic forces may worsen the movement and dispersion of catalyst particles. To fight the resulting operational problems, such as sheeting and chunking, continuity aid (CA) has been used to reduce the electrostatic force and improve the reactor operation. However, using CA can add to the cost, reduce catalyst activity and increase complicity of reactor operation, and CA's chemical properties may cause product quality concerns for some of the food and medical applications. Reducing or eliminating the use of CA is desired, for both the dry-catalyst-feeding reactors and slurry-catalyst-feeding reactors.

SUMMARY

An embodiment disclosed herein provides a method for making a polyolefin catalyst support. The method includes forming a suspension of a catalyst support in a protic liquid having a pH between about 4.5 and about 7.5 and applying a shear stress to the suspension of between about 100 kPa and about 5000 kPa. The pH of the suspension is adjusted to between about 8 and about 11. Nanoparticles are added to the suspension. Then, the pH of the suspension is adjusted to between about 4 and about 7 and the shear stress on the suspension is continued for about 5 minutes to about 60 minutes. A solid is separated from the suspension. The solid is washed with a solvent having a pH between about 4.5 and about 7.5 and dried.

Another embodiment provides a polyolefin catalyst. The polyolefin catalyst comprises a catalyst support, wherein the catalyst support has an average particle size of about 2 microns to about 200 microns. Nanoparticles are adhered to the catalyst support, wherein the nanoparticles have an average particle size of about 2 to about 200 nanometers. A catalyst is supported on the catalyst support.

Another embodiment provides a method of preparing a solid polyolefin catalyst support. The method includes forming a suspension of nanoparticles in a solvent and adding an organic silica precursor and water to the suspension. A sol-gel reaction catalyst is added to the suspension and the suspension is mixed at a shear stress of between about 100 kPa and about 5000 kPa. A catalyst support is added to the suspension. The shear stress is continued on the suspension for about 5 minutes to about 720 minutes. The solid is washed with a solvent having a pH between about 4.5 and about 7.5 and dried.

DETAILED DESCRIPTION

Embodiments described within provide methods and systems for coating catalyst supports and active catalyst particles to reduce cohesion and, thus, enhance catalyst flow and dispersion. For example, a dry catalyst support, e.g., silica, may be coated with inert nano-scale particles to improve the dry powder's flowability by the reduction of inter-particle forces, without substantially affecting the chemical and catalytic properties of the catalyst. As used herein, the descriptive term "nano" implies a particle size of less than one micron (1000 nanometers or nm). In various embodiments, nano-scale particles, or "nanoparticles," may be between about 2 nm and about 200 nm, and may include the agglomerates of nano-scale particles in the same size range. However, different coating technologies may not achieve a nanoparticle attachment that can last a relatively long time, and cannot sufficiently stand the attrition caused by the collision of particles in a dense-phase fluidized bed. Various embodiments described herein provide catalyst-preparation procedures that allow for the formation of a stable "spot coating" of the inert nano-sized particles on the catalyst support. In most cases, the nanoparticles are adhered to the catalyst support and, thus, the active catalyst. As used herein, "adhered" indicates that the forces holding the nanoparticles to the catalyst support are sufficiently strong that the spot coatings can stand the normal operation conditions of catalyst calcination, activation, storage, feed, or dispersion into the fluidized-bed polymerization reactor.

In one embodiment, the catalyst support goes through the "nano-coating" procedure before impregnating any active catalyst component. The chemical nature of the "nano-sized" particles is inert, i.e., does not affect the polymerization reaction. Chemically, the nano-sized particles can be the same as or different from the catalyst support. The nano-coating created by this invention is stable on, or adheres to, the particle surface, and can stand the further processes of catalyst preparation, storage, feeding, etc.

The coated nanoparticles can also be conductive material, for the purpose of static charge reduction, hence reducing or eliminating the usage of continuity aid (CA) in gas-phase polymerization reactors. In some embodiments, either conductive or non-conductive nanoparticles can be applied using a wet-treatment technique, as described with respect to FIGS. 1 and 2. The technology can be applied to catalyst in both dry-catalyst feed and slurry-catalyst feed. The conductive CA can be added to the catalyst or fed separately and allowed to mix in the reactor In other embodiments, a polyolefin catalyst can be mixed before addition to the reactor or fed separately and to the reactor where mixing would occur with conductive nanoparticles, e.g., carbon black, to improve reactor operability, for example, by improving catalyst flow into the reactor. Examples of conductive carbon blacks include graphene nanoplatelets, graphite nanoparticles, Multi-Walled Carbon Nanotubes, and conductive standard carbon blacks. Graphene nanoplatelets include, for example, Grade M and Grade C, available from XG Sciences, a company with a business office in Lansing, Mich. For example, Grade M-5, with an average particle diameter of 5 microns may be suitable. Additionally, Grade C-500, with an average particle thickness of about 2 nanometers, an average particle diameter of between 1-2 microns, and a surface area of 500 $m^2/g$ may be suitable. Graphite nanoparticles include, for example, materials commercially available from ACS Material, a company with a business office in Medford, Mass. Multi-Walled Carbon Nanotubes include materials available from Sigma-Aldrich, a company with a business office in St. Louis, Mo. Conductive standard carbon blacks include, for example, VULCAN XC72R, available from Cabot Corporation, a company with a business office in Boston, Mass. The conductive nanoparticles may be selected from the group consisting of graphene nanoplatelets, graphite nanoparticles, Multi-Walled Carbon Nanotubes, and conductive standard carbon blacks. The conductive nanoparticles may also be selected from the group consisting of any combination of the conductive nanoparticles mentioned herein.

The reactor operability may be substantially improved, evidenced by a polymerization test conducted in the lab of UNIVATION Technologies LLP, which showed almost no polymer particle attachment on the wall of an autoclave reactor. In comparison, the walls of the same reactor may have obvious wall coating when conductive nanoparticles are not blended with a catalyst. The catalysts can be dried supported catalysts or spray dried slurry catalysts.

Various catalyst systems and components may be used to generate the polymers and molecular weight compositions desired. These are discussed in the sections to follow. The first section discusses catalyst compounds that can be used in embodiments, including metallocene catalysts, among others. The second section discusses generating catalyst slurries that may be used for implementing the techniques described. The third section discusses supports that may be used. The fourth section discusses catalyst activators that may be used. Gas phase polymerizations may use static control or continuity agents, and the use of those agents may be reduced or eliminated by this invention, which are discussed in the fifth section. A gas-phase polymerization reactor is discussed in the sixth section. The use of the catalyst composition to control product properties is discussed in a sixth section and an exemplary polymerization process is discussed in the seventh section. Examples of the implementation of the procedures discussed in incorporated into an eighth section.

Catalyst Compounds

Metallocene Catalyst Compounds

Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds can include "half sandwich" and/or "full sandwich" compounds having one or more Cp ligands (cyclopentadienyl and ligands isolobal to cyclopentadienyl) bound to at least one Group 3 to Group 12 metal atom, and one or more leaving groups bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring systems, at least a portion of which includes π-bonded systems, such as cycloalkadienyl ligands and heterocyclic analogues. The rings or ring systems typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorous, germanium, boron, aluminum, and combinations thereof, where carbon makes up at least 50% of the ring members. In a more particular exemplary embodiment, the Cp ligands are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3 or +4. The groups bound to the metal atom "M" are such that the compounds described below in the formulas and structures are electrically neutral, unless otherwise indicated. The Cp ligand forms at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene catalyst compounds can be represented by the formula (I).

$$Cp^A Cp^B MX_n \qquad (I)$$

In formula (I), M is as described above; each X is chemically bonded to M; each Cp group is chemically bonded to M; and n is 0 or an integer from 1 to 4. In some embodiments, n may be 1 or 2. The ligands represented by $Cp^A$ and $Cp^B$ in formula (I) can be the same or different cyclopentadienyl ligands or ligands isolobal to cyclopentadienyl, either or both of which can contain heteroatoms and either or both of which can be substituted by a group R. In at least one specific embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) can be unsubstituted or substituted with any one or combination of substituent groups R. Non-limiting examples of substituent groups R as used in structure (I) as well as ring substituents in structures Va-d, discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. More particular non-limiting examples of alkyl substituents R associated with formulas (I) through (Va-d) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluroethyl, difluroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated substituents including vinyl-terminated ligands such as, for example, 3-butenyl, 2-propenyl, 5-hexenyl, and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R such as 1-butanyl can form a bonding association to the element M.

Each X in the formula (I) above and for the formula/structures (II) through (Va-d) below is independently selected from the group consisting of: any leaving group, in one exemplary embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof, in a more particular exemplary embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxyl, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular exemplary embodiment; hydride, chloride, fluoride, methyl, phenyl, phenoxy, benzoxy, tosyl, fluoromethyls and fluorophenyls, in yet a more particular exemplary embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls, in yet a more particular exemplary embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls, in yet a more particular exemplary embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetraand pentafluorophenyls), in yet a more particular exemplary embodiment; and fluoride, in yet a more particular exemplary embodiment.

Other non-limiting examples of X groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis (N-methylanilide), dimethylamide, dimethylphosphide radicals and the like. In one exemplary embodiment, two or more X's form a part of a fused ring or ring system. In at least one specific embodiment, X can be a leaving group selected from the group consisting of fluoride ions, chloride ions, bromide ions, $C_1$ to $C_{10}$ alkyls, and $C_2$ to $C_{12}$ alkenyls, carboxylates, acetylacetonates, and alkoxides.

The metallocene catalyst compound includes those of formula (I) where $Cp^A$ and $Cp^B$ are bridged to each other by at least one bridging group, (A), such that the structure is represented by formula (II).

$$Cp^A(A)Cp^B MX_n \qquad (II)$$

The bridged compounds represented by formula (II) are known as "bridged metallocenes." The elements $Cp^A$, $Cp^B$, M, X and n in structure (II) are as defined above for formula (I); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. In at least one specific embodiment, the bridging group (A) can also include substituent groups R as defined above for (for formula (I)) including halogen radicals and iron. In at least one specific embodiment, the bridging group (A) can be represented by $C_1$ to $C_6$ alkylenes, substituted $C_1$ to $C_6$ alkylenes, oxygen, sulfur, $R'_2C=$, $R'_2Si=$, $=Si(R'_2)Si(R'_2)=$, $R'_2Ge=$, and $R'P=$, where "=" represents two chemical bonds, R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and where two or more R' can be joined to form a ring or ring system. In at least one specific embodiment, the bridged metallocene catalyst compound of formula (II) includes two or more bridging groups (A). In one or more embodiments, (A) can be a divalent bridging group bound to both $Cp^A$ and $Cp^B$ selected from the group consisting of divalent $C_1$ to $C_{20}$ hydrocarbyls and $C_1$ to $C_{20}$ heteroatom containing hydrocarbonyls, where the heteroatom containing hydrocarbonyls include from one to three heteroatoms.

The bridging group (A) can include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties where the Si atom is replaced by a Ge or a C atom; as well as dimethylsilyl, diethylsilyl, dimethylgermyl and diethylgermyl.

The bridging group (A) can also be cyclic, having, for example, 4 to 10 ring members; in a more particular exemplary embodiment, bridging group (A) can have 5 to 7 ring members. The ring members can be selected from the elements mentioned above, and, in a particular embodiment, can be selected from one or more of B, C, Si, Ge, N, and O. Non-limiting examples of ring structures which can be present as, or as part of, the bridging moiety are cyclobutylidene, cyclopentylidene, cyclohexylidene, cycloheptylidene, cyclooctylidene and the corresponding rings where one or two carbon atoms are replaced by at least one of Si, Ge, N and O. In one or more embodiments, one or two carbon atoms can be replaced by at least one of Si and Ge. The bonding arrangement between the ring and the Cp groups can be cis-, trans-, or a combination thereof.

The cyclic bridging groups (A) can be saturated or unsaturated and/or can carry one or more substituents and/or can be fused to one or more other ring structures. If present, the one or more substituents can be, in at least one specific embodiment, selected from the group consisting of hydrocarbyl (e.g., alkyl, such as methyl) and halogen (e.g., F, Cl). The one or more Cp groups to which the above cyclic bridging moieties can optionally be fused can be saturated or unsaturated, and are selected from the group consisting of those having 4 to 10, more particularly 5, 6, or 7 ring members (selected from the group consisting of C, N, O, and S in a particular exemplary embodiment) such as, for example, cyclopentyl, cyclohexyl and phenyl. Moreover, these ring structures can themselves be fused such as, for example, in the case of a naphthyl group. The ring structures can carry one or more substituents. Illustrative, non-limiting examples of these substituents are hydrocarbyl (particularly alkyl) groups and halogen atoms. The ligands $Cp^A$ and $Cp^B$ of formula (I) and (II) can be different from each other. The ligands $Cp^A$ and $Cp^B$ of formula (I) and (II) can be the same.

The metallocene catalyst compound can include bridged mono-ligand metallocene compounds (e.g., mono cyclopentadienyl catalyst components). Exemplary metallocene catalyst compounds are further described in U.S. Pat. No. 6,943,134.

It is contemplated that the metallocene catalyst components discussed and described above include their structural or optical or enantiomeric isomers (racemic mixture), and, in one exemplary embodiment, can be a pure enantiomer. As used herein, a single, bridged, asymmetrically substituted metallocene catalyst compound having a racemic and/or meso isomer does not, itself, constitute at least two different bridged, metallocene catalyst components.

The amount of the transition metal component of the one or more metallocene catalyst compounds in the catalyst system can range from a low of about 0.2 wt. %, about 3 wt. %, about 0.5 wt. %, or about 0.7 wt. % to a high of about 1 wt. %, about 2 wt. %, about 2.5 wt. %, about 3 wt. %, about 3.5 wt. %, or about 4 wt. %, based on the total weight of the catalyst system.

The "metallocene catalyst compound" can include any combinations of any embodiments discussed and described herein. For example, the metallocene catalyst compound can include, but is not limited to, bis(n-propylcyclopentadienyl) hafnium $(CH_3)_2$, bis (n-propylcyclopentadienyl) hafnium $F_2$, bis(n-propylcyclopentadienyl) hafnium $Cl_2$, bis(n-butyl, methyl cyclopentadienyl) zirconium $Cl_2$, or [(2,3,4,5,6Me$_5$C$_6$N)CH$_2$CH$_2$]$_2$NHZrBn$_2$, where Bn is a benzyl group, or any combinations thereof.

In addition to the metallocene catalyst compounds discussed and described above, other suitable metallocene catalyst compounds can include, but are not limited to, metallocenes discussed and described in U.S. Pat. Nos. 7,741,417; 7,179,876; 7,169,864; 7,157,531; 7,129,302; 6,995,109; 6,958,306; 6,884,748; 6,689,847; and WO Publications WO 97/22635; WO 00/699/22; WO 01/30860; WO 01/30861; WO 02/46246; WO 02/50088; WO 04/026921; and WO 06/019494.

Other metallocene catalyst compounds that may be used are supported constrained geometry catalysts (sCGC) that include (a) an ionic complex, (b) a transition metal compound, (c) an organometallic compound, and (d) a support material. Such sCGC catalysts are described in PCT Publication WO2011/017092. In some embodiments, the sCGC catalyst may include a borate ion. The borate anion is represented by the formula $[BQ_{4-z'}(G_q(T-H)_r)_{z'}]^{d-}$, wherein: B is boron in a valence state of 3; Q is selected from the group consisting of hydride, dihydrocarbylamido, halide, hydrocarbyloxide, hydrocarbyl, and substituted-hydrocarbyl radicals; z' is an integer in a range from 1 to 4; G is a polyvalent hydrocarbon radical having r+1 valencies bonded to M' and r groups (T-H); q is an integer, 0 or 1; the group (T-H) is a radical wherein T includes O, S, NR, or PR, the O, S, N or P atom of which is bonded to hydrogen atom H, wherein R is a hydrocarbyl radical, a trihydrocarbylsilyl radical, a trihydrocarbyl germyl radical or hydrogen; r is an integer from 1 to 3; and d is 1. Alternatively the borate ion may be representative by the formula $[BQ_{4-z'}(G_q(T-M°R^C_{x-1}X^a_y)_r)_{z'}]^{d-}$, wherein: B is boron in a valence state of 3; Q is selected from the group consisting of hydride, dihydrocarbylamido, halide, hydrocarbyloxide, hydrocarbyl, and substituted-hydrocarbyl radicals; z' is an integer in a range from 1 to 4; G is a polyvalent hydrocarbon radical having r+1 valencies bonded to B and r groups $(T-M°R^C_{x-1}X^a_y)$; q is an integer, 0 or 1; the group $(T-M°R^C_{x-1}X^a_y)$ is a radical wherein T includes O, S, NR, or PR, the O, S, N or P atom of which is bonded to M°, wherein R is a hydrocarbyl radical, a trihydrocarbylsilyl radical, a trihydrocarbyl germyl radical or hydrogen; M° is a metal or metalloid selected from Groups 1-14 of the Periodic Table of the Elements, $R^C$ independently each occurrence is hydrogen or a group having from 1 to 80 nonhydrogen atoms which is hydrocarbyl, hydrocarbylsilyl, or hydrocarbylsilylhydrocarbyl; $X^a$ is a noninterfering group having from 1 to 100 nonhydrogen atoms which is halo-substituted hydrocarbyl, hydrocarbylamino-substituted hydrocarbyl, hydrocarbyloxy-substituted hydrocarbyl, hydrocarbylamino, di(hydrocarbyl)amino, hydrocarbyloxy or halide; x is a nonzero integer which may range from 1 to an integer equal to the valence of M°; y is zero or a nonzero integer which may range from 1 to an integer equal to 1 less than the valence of M°; and x+y equals the valence of M°; r is an integer from 1 to 3; and d is 1. In some embodiments, the borate ion may be of the above described formulas where z' is 1 or 2, q is 1, and r is 1.

The catalyst system can include other single site catalysts such as Group 15-containing catalysts. The catalyst system can include one or more second catalysts in addition to the single site catalyst compound such as chromium-based catalysts, Ziegler-Natta catalysts, one or more additional single-site catalysts such as metallocenes or Group 15-containing catalysts, bimetallic catalysts, and mixed catalysts. The catalyst system can also include $AlCl_3$, cobalt, iron, palladium, or any combination thereof.

Illustrative but non-limiting examples of metallocene catalyst compounds that may be used include: bis(cyclopentadienyl) titanium dimethyl; bis(cyclopentadienyl) titanium diphenyl; bis(cyclopentadienyl) zirconium dimethyl; bis(cyclopentadienyl) zirconium diphenyl; bis(cyclopentadienyl) hafnium dimethyl or diphenyl; bis(propylcyclopentadienyl) hafnium dimethyl; bis(cyclopentadienyl) titanium di-neopentyl; bis(cyclopentadienyl) zirconium di-neopentyl; bis (indenyl) zirconium dimethyl (rac and mes); bis(cyclopentadienyl) titanium dibenzyl; bis(cyclopentadienyl) zirconium dibenzyl; bis(cyclopentadienyl) vanadium dimethyl; bis(cyclopentadienyl) titanium methyl chloride; (pentamethylcyclopentadienyl) (1-methylindenyl) zirconium dimethyl; (tetramethylcyclopentadienyl) (1,3-dimethylindenyl) zirconium dimethyl; bis(cyclopentadienyl) titanium ethyl chloride; bis(cyclopentadienyl) titanium phenyl chloride; bis(cyclopentadienyl) zirconium methyl chloride; bis (cyclopentadienyl) zirconium ethyl chloride; bis(cyclopentadienyl) zirconium phenyl chloride; bis(cyclopentadienyl) titanium methyl bromide; cyclopentadienyl titanium trimethyl; cyclopentadienyl zirconium triphenyl; cyclopentadienyl zirconium trineopentyl; cyclopentadienyl zirconium trimethyl; cyclopentadienyl hafnium triphenyl; cyclopentadienyl hafnium trineopentyl; cyclopentadienyl hafnium trimethyl; pentamethylcyclopentadienyl titanium trichloride; pentaethylcyclopentadienyl titanium trichloride; bis (indenyl) titanium diphenyl or dichloride; bis(methylcyclopentadienyl) titanium diphenyl or dihalide; bis(1,2-dimethylcyclopentadienyl) titanium diphenyl or dichloride; bis(1,2-diethylcyclopentadienyl) titanium diphenyl or dichloride; bis(pentamethyl cyclopentadienyl) titanium diphenyl or dichloride; dimethyl silyldicyclopentadienyl titanium diphenyl or dichloride; methyl phosphine dicyclopentadienyl titanium diphenyl or dichloride; methylenedicyclopentadienyl titanium diphenyl or dichloride; isopropyl (cyclopentadienyl) (fluorenyl) zirconium dichloride; isopropyl(cyclopentadienyl) (octahydrofluorenyl) zirconium dichloride; diisopropylmethylene (cyclopentadienyl) (fluorenyl) zirconium dichloride; diisobutylmethylene (cyclopentadienyl) (fluorenyl) zirconium dichloride; ditertbutylmethylene (cyclopentadienyl) (fluorenyl) zirconium dichloride; cyclohexylidene (cyclopentadienyl) (fluorenyl) zirconium dichloride; diisopropylmethylene (2,5-dimethylcyclopentadienyl) (fluorenyl) zirconium dichloride; isopropyl (cyclopentadienyl) (fluorenyl) hafnium dichloride; diphenylmethylene (cyclopentadienyl) (fluorenyl) hafnium dichloride; diisopropylmethylene (cyclopentadienyl) (fluorenyl) hafnium dichloride; diisobutylmethylene (cyclopentadienyl) (fluorenyl)hafnium dichloride; ditertbutylmethylene (cyclopentadienyl) (fluorenyl) hafnium dichloride; cyclohexylindene (cyclopentadienyl) (fluorenyl) hafnium dichloride; diisopropylmethylene (2,5-dimethylcyclopentadienyl) (fluorenyl) hafnium dichloride; isopropyl (cyclopentadienyl) (fluorenyl) titanium dichloride; diphenylmethylene (cyclopentadienyl) (fluorenyl) titanium dichloride; diisopropylmethylene (cyclopentadienyl) (fluorenyl) titanium dichloride; diisobutylmethylene (cyclopentadienyl) (fluorenyl) titanium dichloride; ditertbutylmethylene (cyclopentadienyl) (fluorenyl) titanium dichloride; cyclohexylidene (cyclopentadienyl) (fluorenyl)titanium uorenyl)titanium dichloride; diisopropylmethylene (2,5-dimethyl cyclopentadienyl fluorenyl) titanium dichloride; racemic-ethylene bis (1-indenyl) zirconium (W) dichloride; racemic-ethylene bis (4,5,6,7-tetrahydro-1-indenyl) zirconium (IV) dichloride; racemic-dimethylsilyl bis(1-indenyl) zirconium (IV) dichloride; racemic-dimethylsilyl bis(4,5,6,7-tetrahydro-1-indenyl) zirconium (IV) dichloride; racemic-1,1,2,2-tetramethylsilanylene bis(1-indenyl) zirconium (IV) dichloride; racemic-1,1,2,2-tetramethylsilanylene bis(4,5,6,7-tetrahydro-1-indenyl) zirconium (IV) dichloride; ethylidene (1-indenyl tetramethylcyclopentadienyl) zirconium (IV) dichloride; racemic-dimethylsilyl bis(2-methyl-4-t-butyl-1-cyclopentadienyl)zirconium (IV) dichloride; racemic-ethylene bis(1-indenyl)hafnium (IV) dichloride; racemic-ethylene bis(4,5,6,7-tetrahydro-1-indenyl) hafnium (IV) dichloride; racemic-dimethylsilyl bis(1-indenyl) hafnium (IV) dichloride; racemic-dimethylsilyl bis(4,5,6,7-tetrahydro-1-indenyl) hafnium (IV) dichloride; racemic-1,1,2,2-tetramethylsilanylene bis(1-indenyl) hafnium (IV) dichloride; racemic-1,1,2,2-tetramethylsilanylene bis(4,5,6,7-tetrahydro-1-indenyl) hafnium (IV) dichloride; ethylidene (1-indenyl-2,3,4,5-tetramethyl-1-cyclopentadienyl) hafnium (IV) dichloride; racemic-ethylene bis(1-indenyl) titanium (IV) dichloride; racemic-ethylene bis(4,5,6,7-tetrahydro-1- indenyl) titanium (IV) dichloride; racemic-dimethylsilyl bis (1-indenyl) titanium (IV) dichloride; racemic-dimethylsilyl bis(4,5,6,7-tetrahydro-1-indenyl) titanium (IV) dichloride; racemic-1,1,2,2-tetramethylsilanylene bis(1-indenyl) titanium (IV) dichloride racemic-1,1,2,2-tetramethylsilanylene bis(4,5,6,7-tetrahydro-1-indenyl) titanium (IV) dichloride; and ethylidene (1-indenyl-2,3,4,5-tetramethyl-1-cyclopentadienyl) titanium (IV) dichloride.

Other metallocene catalyst compounds that may be used in embodiments are diphenylmethylene (cyclopentadienyl) (fluorenyl) zirconium dichloride; racemic-dimethylsilyl bis (2-methyl-1-indenyl) zirconium (IV) dichloride; racemic-dimethylsilyl bis(2-methyl-4-(1-naphthyl-1-indenyl) zirconium (IV) dichloride; and racemic-dimethylsilyl bis(2-methyl-4-phenyl-1-indenyl) zirconium (IV) dichloride. Further metallocene catalyst compounds include: indenyl zirconium tris(diethylcarbamate); indenyl zirconium tris (pivalate); indenyl zirconium tris(p-toluate); indenyl zirconium tris(benzoate); (1-methylindenyl)zirconium tris(pivalate); (2-methylindenyl)zirconium tris(diethylcarbamate); (methylcyclopentadienyl)zirconium tris(pivalate); cyclopentadienyl tris(pivalate); and (pentamethylcyclopentadienyl)zirconium tris(benzoate).

Examples of structures of metallocene compounds that may be used in embodiments include the hafnium compound shown as formula (II), the zirconium compounds shown as formulas (IV-A-C), and bridged zirconium compounds, shown as formulas (V-A-B).

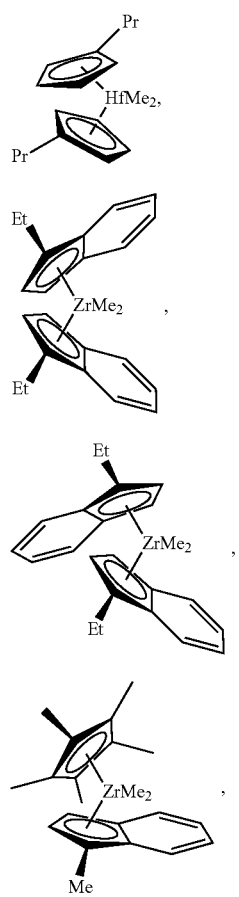

(III)

(IV-A)

(IV-B)

(IV-C)

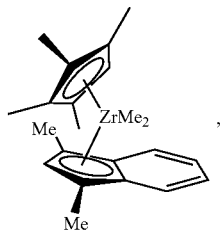

(IV-D)

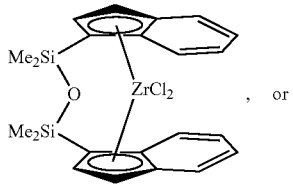

(V-A)

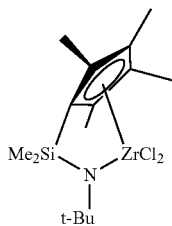

(V-B)

Although these compounds are shown with methyl- and chloro-groups attached to the central metal, it can be understood that these groups may be different without changing the catalyst involved. For example, each of these substituents may independently be a methyl group (Me), a chloro group (Cl), a fluoro group (F), or any number of other groups, including organic groups, or heteroatom groups. Further, these substituents will change during the reaction, as a pre-catalyst is converted to the active catalyst for the reaction.

Group 15 Atom and Metal-Containing Catalyst Compounds

The catalyst system can include one or more Group 15 metal-containing catalyst compounds. The Group 15 metal-containing compound generally includes a Group 3 to 14 metal atom, a Group 3 to 7, or a Group 4 to 6 metal atom. In many embodiments, the Group 15 metal-containing compound includes a Group 4 metal atom bound to at least one leaving group and also bound to at least two Group 15 atoms, at least one of which is also bound to a Group 15 or 16 atom through another group.

In one or more embodiments, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and can optionally be bound to hydrogen, a halogen, a heteroatom or a hydrocarbyl group, or a heteroatom containing group.

The Group 15-containing metal compounds can be described more particularly with formulas (VI) or (VII).

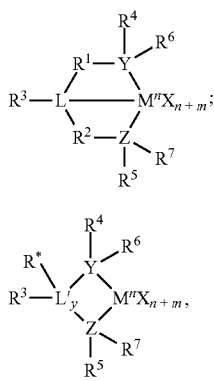

(VI)

(VII)

In Formulas (VI) and (VII), M is a Group 3 to 12 transition metal or a Group 13 or 14 main group metal, a Group 4, 5, or 6 metal. In many embodiments, M is a Group 4 metal, such as zirconium, titanium or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In many embodiments, n is +4. The term 'm' represents the formal charge of the YZL or the YZL' ligand, and is 0, −1, −2 or −3 in various embodiments. In many embodiments, m is −2. L is a Group 15 or 16 element, such as nitrogen; L' is a Group 15 or 16 element or Group 14 containing group, such as carbon, silicon or germanium. Y is a Group 15 element, such as nitrogen or phosphorus. In many embodiments, Y is nitrogen. Z is a Group 15 element, such as nitrogen or phosphorus. In many embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In many embodiments, $R^1$ and $R^2$ are a $C_2$ to $C_{20}$ alkyl, aryl, or aralkyl group, such as a linear, branched, or cyclic $C_2$ to $C_{20}$ alkyl group, or a $C_2$ to $C_6$ hydrocarbon group. $R^1$ and $R^2$ may also be interconnected to each other. $R^3$ may be absent or may be a hydrocarbon group, a hydrogen, a halogen, a heteroatom containing group. In many embodiments, $R^3$ is absent or a hydrogen, or a linear, cyclic or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, often having up to 20 carbon atoms. In many embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic, or branched alkyl group having 1 to 20 carbon atoms. In many embodiments, $R^6$ and $R^7$ are absent. R* may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ are independently a group represented by the following formula (VIII).

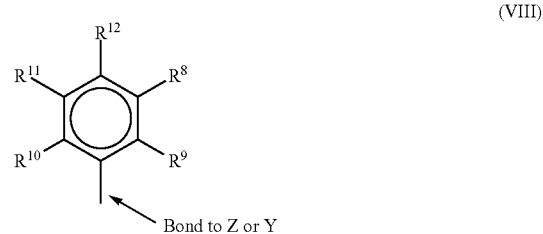

(VIII)

When $R^4$ and $R^5$ are as formula VII, $R^8$ to $R^{12}$ are each independently hydrogen, a $C_1$ to $C_{40}$ alkyl group, a halide, a heteroatom, a heteroatom containing group containing up to 40 carbon atoms. In many embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by the following formula (IX).

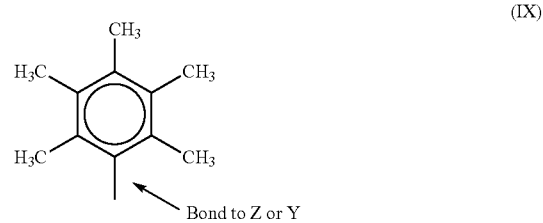

(IX)

When $R^4$ and $R^5$ follow formula IX, M is a Group 4 metal, such as zirconium, titanium, or hafnium. In many embodiments, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

The Group 15 metal-containing catalyst compound can be represented by the following formula (X).

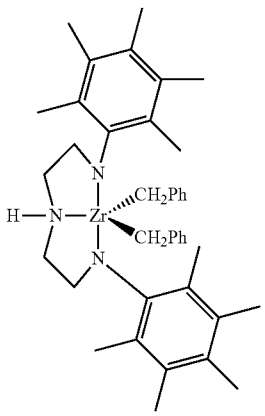

(X)

In formula X, Ph represents phenyl. Representative Group 15-containing metal compounds and preparation thereof can be as discussed and described in U.S. Pat. Nos. 5,318,935; 5,889,128; 6,333,389; 6,271,325; and 6,689,847; WO Publications WO 99/01460; WO 98/46651; WO 2009/064404; WO 2009/064452; and WO 2009/064482; and EP 0 893 454; and EP 0 894 005.

Transition Metal Catalysts

Some conventional-type transition metal catalysts may be supported on the alternate catalyst supports described herein. Conventional-type transition metal catalysts are those traditional Ziegler-Natta catalysts that are well known in the art. Illustrative Ziegler-Natta catalyst compounds are disclosed in Ziegler Catalysts 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973; 5,525,678; 5,288,933; 5,290,745; 5,093,415; and 6,562,905. Examples of such catalysts include those including Group 4, 5 or 6 transition metal oxides, alkoxides and halides, or oxides, alkoxides and halide compounds of titanium, zirconium or vanadium; optionally in combination with a magnesium compound, internal or external electron donors (alcohols, ethers, siloxanes, etc.), aluminum or boron alkyl and alkyl halides, and inorganic oxide supports.

These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3/AlCl_3$ and $Ti(OCl_2H_{25})Cl_3$.

Catalysts derived from Mg/Ti/Cl/THF (tetrahydrofuran) can be used. One example of the general method of preparation of such a catalyst includes the following: dissolve $TiCl_4$ in THF, reduce the compound to $TiCl_3$ using Mg, add $MgCl_2$, and remove the solvent. Specific examples of other conventional-type transition metal catalysts are discussed in more detail in U.S. Pat. Nos. 4,115,639; 4,077,904; 4,482,687; 4,564,605; 4,721,763; 4,879,359; and 4,960,741. Conventional-type transition metal catalyst compounds based on magnesium/titanium electron-donor complexes are described in, for example, U.S. Pat. Nos. 4,302,565 and 4,302,566.

Catalyst Support

As used herein, the terms support or catalyst support refer to any support material, including a porous support material, such as talc, inorganic oxides, and inorganic chlorides. Generally, catalyst supports are particulate materials that support the catalyst compound and activators during the reaction. Catalyst compounds used in the catalyst feed can be supported on the same supports together with the activator, or the activator can be used in an unsupported form, or can be deposited on a support different from the single site catalyst compounds, or any combination thereof. This may be accomplished by any technique commonly used in the art. There are various other methods in the art for supporting a single site catalyst compound. For example, the single site catalyst compound can contain a polymer bound ligand as described in, for example, U.S. Pat. Nos. 5,473,202 and 5,770,755. The single site catalyst compounds can be spray dried as described in, for example, U.S. Pat. No. 5,648,310. The support used with the single site catalyst compound can be functionalized, as described in EP 0 802 203, or at least one substituent or leaving group is selected as described in U.S. Pat. No. 5,688,880.

The support can be or include one or more inorganic oxides, for example, of Group 2, 3, 4, 5, 13, or 14 elements. The inorganic oxide can include, but is not limited to silica, alumina, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. The support can be or include alumina, silica, or a combination thereof. In one embodiment described herein, the support is silica.

Suitable commercially available silica supports can include, but are not limited to, ES70, and ES70W, available from PQ Corporation, Davison 955, and Davison 2408, available from the Grace-Davison division of Grace Chemical Co. Suitable commercially available silica-alumina supports can include, but are not limited to, SIRAL® 20, SIRAL® 28M, SIRAL® 30, and SIRAL® 40, available from SASOL®. Suitable supports also include CAB-O-SIL Fumed Silica available from Cabot Corporation or Aerosols silica gels. Generally, catalysts supports comprising silica gels with activators, such as methylaluminoxanes (MAOs), are used in the trim systems described, since these supports may function better for cosupporting solution carried catalysts. In an embodiment described herein, the support is ES70.

Suitable catalyst supports are discussed and described in Hlatky, Chem. Rev. (2000), 100, 1347 1376 and Fink et al., Chem. Rev. (2000), 100, 1377 1390, U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,698,487; 5,714,424; 5,723,400; 5,723,402; 5,731,261; 5,759,940; 5,767,032 and 5,770,664; and WO 95/32995; WO 95/14044; WO 96/06187; and WO 97/02297.

Adhering Nanoparticles to Catalyst Support

FIG. 1 is a process flow diagram of a method 100 for forming a flowable catalyst support. The nanoparticles may be adhered to the catalyst support through a pH adjustment process. The method begins at block 102 with the formation of a uniform suspension of solid catalyst support with an average particle size between 2 to 200 micron in a liquid. The liquid can be a protic solvent or a solvent mixture with a pH between about 4.5 and about 7.5. The concentration of the catalyst support in the solvent can be between about 0.5 weight % to about 50 weight %.

As discussed herein, the catalyst support can be any number of inorganic oxides, among other materials, having a high surface area. For example, the catalyst support can include alumina, thoria, silica, and zirconia, as well as any mixtures thereof. Other inorganic supports may also be used.

Any number of protic solvents may be used including, for example, water, methanol, and ethanol, among others. A suitable protic solvent will display hydrogen bonding and have acidic hydrogen, although it may be a very weak acid. Further, the solvent should stabilize ions, for example, cations by unshared free electron pairs or anions by hydrogen bonding.

At block 104, a shear stress of between about 100 and about 5000 kPa is applied to the suspension. Any number of techniques may be used to apply the shear stress to suspension, including, for example, mechanical mixing, sonication, a mixing loop with internal static mixers, or any number of other techniques.

At block 106, the pH of the suspension is adjusted to a value between about 8 and about 11 using a base that does not contain sulfur. A suitable base can be completely dissolved in the protic solvent, such as ammonium hydroxide, sodium hydroxide, potassium hydroxide, organic amines and their mixtures, among others.

At block 108, nanoparticles are added to the sheared suspension, while continue to apply the shear stress. The nanoparticles may be added at a weight ratio of the nanoparticles to the catalyst support of between about 1:100 and about 20:100. The nanoparticles can have any number of shapes, including, for example, spheres, plates, and fibers, among others. The nanoparticles can be made from any number of materials, including, metal/transition metal oxides, for example, silica, alumina, zirconia, titanium dioxide, carbon black, or other conductive particles, and the like. Mixtures may be used for further property gains, for example, combining silica nanoparticles with conductive carbon black nanoparticles.

At block 110, the pH of the suspension is adjusted to a value between about 4.0 and about 7.0. The pH adjustment is performed by the addition of an acid that has no sulfur atoms. During the pH adjustment, the mixing is continued, with the shear rate maintained between about 100 kPa and about 5000 kPa.

At block 112, the mixing is continued for a time period of about 5 minutes to about 60 minutes. At block 114, a solid is separated from the suspension, for example, by vacuum evaporation, filtration, vacuum filtration, cyclonic separation, or the like.

At block 116, the solid is washed by a solvent or a solvent mixture, such as protic solvent described with respect to block 102, having a value for pH of between about 4.5 and about 7.5. At block 118, the solid is dried following generally known procedures for drying catalyst supports. Further, the same activation procedure generally used for the solid catalysts may be used in embodiments.

Once the solid catalyst support is dried and activated, a polymerization catalyst can be made using the catalyst support. Catalysts that can be supported on the catalyst supports described herein include Ziegler-Natta catalysts, chromium catalysts, metallocene catalysts, non-metallocene single-site catalysts, rare-earth catalysts, and any number of other types of supported catalysts.

Adhering Nanoparticles to Catalyst Support in a Sol-Gel Reaction

The nano-coating techniques are not limited to an acid/base reaction. In another embodiment, nanoparticles may be adhered to the catalyst support by a sol-gel reaction process.

FIG. 2 is a process flow diagram of a method 200 for preparing a catalyst support using a sol-gel reaction. The method 200 begins at block 202 with the formation of a suspension of nanoparticles in a solvent. The nanoparticles may have an average particle size between about 2 nanometers and about 200 nanometers, and include the agglomerates of nanoparticles in the same size range. The concentration of the nanoparticles in the solvent may be between about 1 weight % and about 50 weight %. The nanoparticles may be in any numbers of shapes, including spheres, plates, and fibers, among others. The nanoparticles can be made from silica, alumina, titanium dioxide, carbon black, and the like. Solvents that can be used for the process include, for example, alcohol, THF, formamide, dimethyl-formamide, or dioxane, and their mixtures.

At block 204, an organic silica precursor is added to the suspension. The organic silica precursor can be silicon alkoxide, such as a silicon monoalkoxide, silicon dialkoxide, silicon trialkoxide, or silicon tetraalkoxide.

At block 206, water is added to the suspension. The amount of water used may be sufficient to bring the molar ratio of water to silicon in the precursor to between about 0.5:1 to about 40:1

At block 208, a sol-gel reaction catalyst is added to the suspension. The amount of the sol-gel reaction catalyst may be sufficient to bring the molar ratio of silicon in the precursor to the catalyst to between about 20:1 and about 1000:1. The sol-gel reaction catalyst can be either an acid or a base. For example, acid catalysts may include $HNO_3$ or organic acids, among others. Bases that may be used include $NH_4OH$ and organic amines, among others.

At block 210, the suspension is mixed under a shear stress of between about 100 kPa and about 5000 kPa. The mixing may be performed by a mixer, a sonicator, a mixing loop, or any other suitable technique. The mixing may be performed for a time period of between about 5 minutes and about 720 minutes, at a temperature of between about 20° C. to about 60° C.

At block 212, a catalyst support is added to the suspension during mixing. The catalyst support may have an average particle size between about 2 microns and about 200 microns. The amount of solid catalyst added may be sufficient to bring the weight ratio of the nanoparticles to the catalyst support to between about 1:100 and about 20:100. The concentration of the catalyst support in the solvent may be between about 1 weight % and about 50 weight %. The catalyst support may be inorganic oxide having a high surface area, such as alumina, silica, thoria, or zirconia, among others, and mixtures thereof.

At block 214, the mixing of the suspension is continued for a time period of about 5 minutes to about 720 minutes. The temperature of the suspension may be maintained between about 20° C. and about 60° C., under the same shear stress.

At block 216, a solid is separated from the suspension. This may be performed using vacuum evaporation, filtration, vacuum filtration, cyclonic separation, or any number of other separation techniques.

At block 218, the solid is dried. For example, this may include heating the solid to a temperature of between about 300° C. and about 800° C. for a time period of between about 10 minutes and about 60 minutes.

The catalyst support generated may then be used to support any number of catalyst compounds. For example, the catalysts may include Ziegler-Natta catalysts, chromium catalysts, metallocene catalysts, non-metallocene single-site catalysts, rare-earth catalysts, and other type of catalysts.

The catalysts generated by the described methods 100, 200 may provide improved catalyst dispersion in the reactor, more stable catalyst feeding rates, and more accurate feeding rate measurement. Further, this may provide better catalyst feed control and prevention of "hot spots" and polymer agglomeration in fluidized-bed polyolefin reactors. When conductive nanoparticles, such as carbon blacks, are employed, the particle coating technology could also reduce the static charge level in the reactor and hence improve the reactor operability, with the possible consequence of reducing or even eliminating the usage of continuity aid (CA) or static control agent. The technology can be applied to both dry-catalyst feed and slurry-catalyst feed.

Further, the techniques described may be used for improving the feeding of dry continuity additives or other additives. Most of the dry additives are Group C cohesive powders with similar feeding problems to those of dry catalysts.

In some embodiments, conductive particles may be adhered to the catalyst particles without using the wet methods of FIGS. 1 and 2. In this case, inter-particle attraction forces may be sufficient, using a dry blend technique to mix the nanoparticles with the catalyst particles.

The conductivity of a material can be characterized by its volumetric conductivity and surface conductivity. When static charge is concerned, the surface conductivity is used. Materials are divided into different categories according to their surface conductivity. A material is categorized as conductive if the surface conductivity is higher than about $10^{-5}$ S/□. As used herein, S/□ is a unit representing surface conductivity. A material is classified as a static diffusion material if the surface conductivity is between about $10^{-9}$ and about $10^{-5}$ S/□. A static diffusion material can discharge static promptly without deteriorating the charged material. A material whose surface resistance is between about $10^{-14}$ S/□ and about $10^{-9}$ S/□ is an antistatic material which can resist electrostatic charge due to friction. Therefore, an antistatic surface needs to have a surface conductivity higher than about $10^{-14}$ S/□. Electrostatic charges may be dissipated effectively by having an antistatic surface.

A wide variety of electrically-conductive materials can be incorporated to make a material antistatic. The electrically-conductive material can be divided into two broad groups, ionic conductors and electron conductors. In ionic conductors, charge is transferred by the bulk diffusion of charged species through an electrolyte. Here, the resistivity of the antistatic layer is dependent on temperature and humidity. The conductivity of an electron conductor is more stable. Electrically-conductive materials include simple inorganic salts, colloidal metal oxide sols, and conductive carbon blacks, among others. Examples of colloidal metal oxide particles include silica, antimony pentoxide, alumina, titania, stannic oxide, zirconia. The volumetric conductivity of carbon black for antistatic application is generally higher than 1 S/m.

In an embodiment, the conductive nanoparticles can be adhered to the catalyst particles by near field inter-particle interactions. When the two particles are brought close, the particle-particle interaction can be described by an attractive charge potential, having a near field component and a far field component. The near field attraction forces include gravity and charge attraction. The far field force mainly comes from the thermal energy. When a particle is close to a critical distance from another particle, e.g., within about 10 nm, two particles will adhere to each other due to the attraction energy, which is too high for the particles to be separated by normal shear force afterwards.

Activator or Co-Catalyst

As used herein, the term "activator" may refer to any compound or combination of compounds, supported, or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component. The activator may also be referred to as a "co-catalyst."

For example, the activator can include a Lewis acid or a non-coordinating ionic activator or ionizing activator, or any other compound including Lewis bases, aluminum alkyls, and/or conventional-type co-catalysts. Illustrative activators can include, but are not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof. For example, activators can include methylaluminoxane ("MAO") and modified methylaluminoxane ("MMAO").

Aluminoxanes can be described as oligomeric aluminum compounds having —Al(R)—O— subunits, where R is an alkyl group. Examples of aluminoxanes include, but are not limited to, MAO, MMAO, ethylaluminoxane, isobutylaluminoxane, or combinations thereof. Aluminoxanes can be produced by the hydrolysis of the respective trialkylaluminum compound. MMAO can be produced by the hydrolysis of trimethylaluminum and a higher trialkylaluminum, such as triisobutylaluminum. MMAOs are generally more soluble in aliphatic solvents and more stable during storage. There are a variety of methods for preparing aluminoxane and modified aluminoxanes, non-limiting examples can be as discussed and described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; and EP 0 561 476; EP 0 279 586; EP 0 594-218; and EP 0 586 665; and WO Publications WO 94/10180 and WO 99/15534.

In one or more embodiments, a visually clear MAO can be used. For example, a cloudy or gelled aluminoxane can be filtered to produce a clear aluminoxane or clear aluminoxane can be decanted from a cloudy aluminoxane solution. In another embodiment, a cloudy and/or gelled aluminoxane can be used. Another aluminoxane can include a modified methyl aluminoxane ("MMAO") type 3A (commercially available from Akzo Chemicals, Inc. under the trade name Modified Methylaluminoxane type 3A, discussed and described in U.S. Pat. No. 5,041,584). A suitable source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

As noted above, one or more organo-aluminum compounds such as one or more alkylaluminum compounds can be used alone or in conjunction with the aluminoxanes. For example, alkylaluminum species that may be used are diethylaluminum ethoxide, diethylaluminum chloride, and/or diisobutylaluminum hydride. Examples of trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and the like.

Continuity Additive/Static Control Agent

In gas-phase polyolefin production processes, as disclosed herein, it may be desirable to additionally use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used. For example, the use of static control agents is disclosed in European Patent No. 0229368 and U.S. Pat. Nos. 4,803,251; 4,555,370; and 5,283,278, and references cited therein.

Control agents such as aluminum stearate may be employed. The static control agent used may be selected for its ability to receive the static charge in the fluidized bed without adversely affecting productivity. Other suitable static control agents may also include aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Any of the aforementioned control agents, as well as those described in, for example, WO 01/44322, listed under the heading "Carboxylate Metal Salt," and including those chemicals and compositions listed as antistatic agents may be employed either alone or in combination as a control agent. For example, the carboxylate metal salt may be combined with an amine containing control agent (e.g., a carboxylate metal salt with any family member belonging to the KEMAMINE® (available from Crompton Corporation) or ATMER® (available from ICI Americas Inc.) family of products).

Other useful continuity additives include ethyleneimine additives useful in embodiments disclosed herein may include polyethyleneimines having the following general formula:

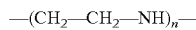

—(CH$_2$—CH$_2$—NH)$_n$— in which n may be from about 10 to about 10,000. The polyethyleneimines may be linear, branched, or hyper-branched (e.g., forming dendritic or arborescent polymer structures). They can be a homopolymer or copolymer of ethyleneimine or mixtures thereof (referred to as polyethyleneimines hereafter). Although linear polymers represented by the chemical formula —[CH$_2$—CH$_2$—NH]— may be used as the polyethyleneimine, materials having primary, secondary, and tertiary branches can also be used.

Commercial polyethyleneimine can be a compound having branches of the ethyleneimine polymer. Suitable polyethyleneimines are commercially available from BASF Corporation under the trade name Lupasol. These compounds can be prepared as a wide range of molecular weights and product activities. Examples of commercial polyethyleneimines sold by BASF suitable for use in the present invention include, but are not limited to, Lupasol FG and Lupasol WF. Another useful continuity additive can include a mixture of aluminum distearate and an ethoxylated amine-type compound, e.g., IRGASTAT AS-990, available from Huntsman (formerly Ciba Specialty Chemicals). The mixture of aluminum distearate and ethoxylated amine type compound can be slurried in mineral oil e.g., Hydrobrite 380. For example, the mixture of aluminum distearate and an ethoxylated amine type compound can be slurried in mineral oil to have total slurry concentration of ranging from about 5 wt. % to about 50 wt. % or about 10 wt. % to about 40 wt. %, or about 15 wt. % to about 30 wt. %. Other useful static control agents and additives are disclosed in U.S. Patent Application Publication No. 2008/0045663.

The continuity additives or static control agents may be added to the reactor in an amount ranging from 0.05 to 200 ppm, based on the weight of all feeds to the reactor, excluding recycle. In some embodiments, the continuity additive may be added in an amount ranging from 2 to 100 ppm, or in an amount ranging from 4 to 50 ppm.

Polymerization Process

The catalyst system described herein can be used to polymerize one or more olefins to provide one or more polymer products therefrom. Any suitable polymerization process can be used, including, but not limited to, gas-phase, and slurry-phase polymerization processes. In various embodiments, polyolefin polymers are produced in a gas-phase polymerization process utilizing a fluidized bed reactor.

A fluidized-bed reactor can include a reaction zone and a velocity reduction zone. The reaction zone can include a bed that includes growing polymer particles, formed polymer particles and a minor amount of catalyst particles fluidized by the continuous flow of the gaseous monomer and diluent to remove heat of polymerization through the reaction zone. Catalyst can be fed to the reaction zone using a dry catalyst feeder or a slurry catalyst feeder.

Optionally, a fraction of the re-circulated gases can be cooled and compressed to form liquids that increase the heat removal capacity of the circulating gas stream when readmitted to the reaction zone. That is called condensing-mode operation or super-condensing-mode operation, depending on the level of condensates in the recycle flow. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone can be passed to the velocity reduction zone where some or most of the entrained particles are removed, for example, by slowing and falling back to the reaction zone. If desired, finer entrained particles and dust can be removed in a separation system, such as a cyclone and/or fines filter. The gas can be passed through a heat exchanger where at least a portion of the heat of polymerization can be removed. The gas can then be compressed in a compressor and returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The term "polyolefin" refers to polyethylene, polypropylene and the homopolymer and copolymer of alpha olefins with carbon number of 4-20. The terms "polyethylene" and "polyethylene copolymer" refer to a polymer having at least 50 wt. % ethylene-derived units. In various embodiments, the polyethylene can have at least 70 wt. % ethylene-derived units, at least 80 wt. % ethylene-derived units, at least 90 wt. % ethylene-derived units, at least 95 wt. % ethylene-derived units, or at least 100 wt. % ethylene-derived units. The polyethylene can, thus, be a homopolymer or a copolymer, including a terpolymer, having one or more other monomeric units. As described herein, a polyethylene can include, for example, at least one or more other olefins or comonomers. Suitable comonomers can contain 3 to 16 carbon atoms, from 3 to 12 carbon atoms, from 4 to 10 carbon atoms, and from 4 to 8 carbon atoms. Examples of comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

The reactor temperature of the fluidized-bed process can be greater than about 30° C., about 40° C., about 50° C., about 90° C., about 100° C., to about 110° C., or higher. In general, to maintain reactor capacity, the reactor temperature may be operated at the highest feasible temperature taking into account avoiding the sintering or softening of the polymer product within the reactor. Thus, the upper temperature limit in one embodiment is the melting temperature of the polyolefin copolymer produced in the reactor.

The gas-phase polymerization reactor can be capable of producing from about 10 kg of polymer per hour (25 lbs/hr) to about 90,900 kg/hr (200,000 lbs/hr), or greater, and greater than about 455 kg/hr (1,000 lbs/hr), greater than about 4,540 kg/hr (10,000 lbs/hr), greater than about 11,300 kg/hr (25,000 lbs/hr), greater than about 15,900 kg/hr (35,000 lbs/hr), and greater than about 22,700 kg/hr (50,000 lbs/hr), and from about 29,000 kg/hr (65,000 lbs/hr) to about 82,000 kg/hr (181,000 lbs/hr).

As noted, a slurry polymerization process can also be used in embodiments. A slurry polymerization process generally uses pressures in the range of from about 101 kPa (1 atmosphere) to about 6,585 kPa (65 atmospheres) or greater, and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene, comonomers, and hydrogen along with catalyst can be added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 10 carbon atoms, such as, for example, a branched alkane.

Hydrogen gas can be used in olefin polymerization to control the final properties of the polyolefin, such as described in the "Polypropylene Handbook," at pages 76-78 (Hamer Publishers, 1996). It may be referred as "chain termination agent." Using certain catalyst systems, increasing concentrations (partial pressures) of hydrogen can increase the flow index (FI) of the polyolefin copolymer generated. The flow index can thus be influenced by the hydrogen concentration. The amount of hydrogen in the polymerization can be expressed as a mole ratio relative to the total polymerizable monomer, for example, ethylene, or a blend of ethylene and hexene or propylene.

The amount of hydrogen used in the polymerization process can be adjusted to achieve the desired flow index of the final polyolefin resin. For example, the mole ratio of hydrogen to total monomer ($H_2$:monomer) can be greater than about 0.0001, greater than about 0.0005, or greater than about 0.001. Further, the mole ratio of hydrogen to total monomer ($H_2$:monomer) can be less than about 10, less than about 5, less than about 3, and less than about 0.10. A desirable range for the mole ratio of hydrogen to monomer can include any combination of any upper mole ratio limit with any lower mole ratio limit described herein. Expressed another way, the amount of hydrogen in the reactor at any time can range to up to about 15,000 ppm, up to about 8,000 ppm in another embodiment, up to about 3,000 ppm, or between about 50 ppm and 5,000 ppm, or between about 50 ppm and 2,000 ppm in another embodiment. The amount of hydrogen in the reactor can range from a low of about 1 ppm, about 50 ppmw, or about 100 ppm to a high of about 400 ppm, about 800 ppm, about 1,000 ppm, about 1,500 ppm, or about 2,000 ppm. Further, the ratio of hydrogen to total monomer ($H_2$:monomer) can be about 0.00001:1 to about 2:1, about 0.005:1 to about 1.5:1, or about 0.0001:1 to about 1:1. The one or more reactor pressures in a gas phase process (either single stage or two or more stages) can vary from 690 kPa (100 psig) to 3,790 kPa (550 psig), in the range from 1,379 kPa (200 psig) to 2,759 kPa (400 psig), or in the range from 1,724 kPa (250 psig) to 2,414 kPa (350 psig).

Any number of process parameters may be adjusted, including manipulating hydrogen or comonomer concentrations in the polymerization system. The concentrations of reactants in the reactor can be adjusted by changing the amount of liquid or gas that is withdrawn or purged from the process, changing the amount and/or composition of a recovered liquid and/or recovered gas returned to the polymerization process, wherein the recovered liquid or recovered gas can be recovered from polymer discharged from the polymerization process. Further, concentration parameters that can be adjusted include changing the polymerization temperature, changing the ethylene partial pressure in the polymerization process, changing the ethylene to comonomer ratio in the polymerization process, changing the activator to transition metal ratio in the activation sequence.

In one embodiment, a polymer product property is measured in-line and in response the ratio of the hydrogen or comonomer to the monomer is altered. The product property measured can include the polymer product's flow index, melt index, density, MWD, comonomer content, composition distribution, and combinations thereof. In another embodiment, when the ratio of the hydrogen or comonomer to the monomer is altered, the introduction rate of the catalyst composition to the reactor, or other process parameters, is altered to maintain a desired production rate.

The product polyethylene can have a melt index ratio (MIR or $I_{21}/I_2$) ranging from about 5 to about 300, or from about 10 to less than about 150, or from about 15 to about 50. Flow index (FI, also called High Load Melt Index, HLMI, or $I_{21}$) can be measured in accordance with ASTM D1238 (190° C., 21.6 kg). The melt index (MI, $I_2$) can be measured in accordance with ASTM D1238 (at 190° C., 2.16 kg weight).

Density can be determined in accordance with ASTM D-792. Density is expressed as grams per cubic centimeter (g/cm$^3$) unless otherwise noted. The polyethylene can have a density ranging from a low of about 0.89 g/cm$^3$, about 0.90 g/cm$^3$, or about 0.91 g/cm$^3$ to a high of about 0.95 g/cm$^3$, about 0.96 g/cm$^3$, or about 0.97 g/cm$^3$.

The polyolefin can be suitable for such articles as films, fibers, nonwoven and/or woven fabrics, extruded articles, and/or molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, and the like.

EXAMPLES

A series of tests were run to coat "host particles" with nanoparticles to see if coating the catalyst support improved the flowability of the particles. Further tests were conducted to determine if the coating stayed intact after calcining, and if the coated catalyst support could be used to make an active catalyst. The "host particles" used in the study were SYLOPOL® 955 Silica, made by Grace Davison, Inc. Snowtex® ST-O Silica Nanoparticles, provided by Nissan Chemical, were also selected for testing.

Methods of Measuring Flowability

The following methods may be employed to quantitatively measure the flowability of samples before and after the coating of the nanoparticles. It can be noted that not all the methods were applied to each sample.

An AOR (Angle of Repose) measurement determines the maximum angle at which a particulate matter forms a self-sustaining slope without collapsing. A higher AOR indicates a relatively higher level of cohesiveness. A Geldart AOR Tester, commercially available via Powder Research Ltd., was employed.

The SBD (Settled Bulk Density, non-tapping) measurement is the maximum amount of material that will fit into a space without packing. For certain material, an increased SBD usually indicates an improvement in flowability. The settled bulk density is the weight of material per unit volume, usually expressed in pounds per cubic foot. The SBD is measured and calculated, for example, by pouring an adequate amount of resin to overflow a 400 cubic centimeter cylinder. The excess of resin at the top of the cylinder is immediately removed by taking a straight edge and sliding across the top of the cylinder. The full cylinder is weighed and the resin weight is calculated in grams. The weight of the resin is divided by the volume of the cylinder and the SBD result is converted to pounds of resin per cubic foot.

A similar measure to the SBD can be made wherein the cylinder is mechanically shaken during the measurement, e.g., being tapped. Tapping settles the particles, increasing the amount of material that can be held by the cylinder. The tapping is conducted sufficiently in the way that further tapping would not increase the reading of the "tapped SBD."

The SBD and tapped SBD can be used to determine the Hausner Ratio (HR), which is the ratio of the tapped SBD to the non-tapped SBD. A lower HR may indicate better flowability. As a reference point, HR>1.25 may indicate a powder with poor flowability.

Catalyst Flowability Improvement Study Via "Wet-Coating"

The wet coating technique discussed as method 100 with respect to FIG. 1 was tested to determine if improvements in catalyst flow could be achieved. The results are discussed in this section. The nanoparticles selected for the tests were silica particles of Snowtex® ST-O, provided by Nissan Chemical in an amorphous silica colloid sol of about 20 wt % silica in water. The silica in the sol has an average size of about 20 nm. The catalyst support selected for the tests was Davison Silica 955 (called "Comparative Sample" in this work), with an average particle size of about 40 microns, manufactured by Grace. Acetic Acid and Ammonium Hydroxide Solution (28% in water) were purchased from Sigma Aldrich Co. and used as received.

Experimental Details

To begin, 450 grams of deionized water were charged in a flask and stirred by a mechanical propeller. To the water, 50 grams of Silica 955 were slowly added and mixed for 30 minutes under a shear stress of 1000 kPa. While maintaining the shear stress, ammonium hydroxide solution was added drop-wise until the pH value of the suspension was about 10. Then 14 grams of Snowtex ST-O (i.e., ~5 weight % of Silica 955) were slowly added to the suspension and the mixture was further mixed for 30 minutes. Afterwards, acetic acid was added drop-wise to the mixture until the pH value was about 5.5. The mixture was further mixed for 30 minutes. Afterwards, the mixture was allowed to sit for 30 minutes and the top supernatant was poured out. The mixture was then washed twice by deionized water. Then the mixture was put on a rotary evaporator where most water was drawn out. The remaining powder was further dried at 100-160° C. for 3 days and kept in a desiccator. This material was identified as "Sample 1."

Later, the Sample 1 went through the calcinations procedure in a small fluidized-bed device at a temperature less than about 875° C., called Sample 2. The coated catalyst support, Sample 2, was further used to prepare a catalyst to ensure that the catalyst was active in the presence of the nanoparticles. The catalyst selected was bis(n-propyl-cyclopentadienyl)hafnium dimethyl (HfP). A solution of methylaluminoxane (MAO) and HfP in dry toluene was added to the support, and dried, to form the polymerization catalyst, following generally known lab scale procedures. The polymerization tests conducted afterward in a lab-scale autoclave polymerization reactor showed that the Sample 2 formed an active catalyst, and the catalysts made from Sample 2 and Comparative Sample have the same catalyst activity, and resulted in the same polyethylene product under the same reaction conditions.

Flowability Evaluation

The nano-coated powder sample, Sample 1, prepared by the above mentioned method showed a significant improvement in the powder flowability, measured by the Hausner Ratio (HR) and angle of repose (AOR).

TABLE 1

Flowability Comparison of Nano-Coated and Non-Coated Silica Particles.

| | RH | AOR | SBD no tapping (g/cc) | SBD tapped (g/cc) | HR |
|---|---|---|---|---|---|
| Comparison Sample (Silica 955, commercial sample, from original container, no coating) | 1.41 | 34.7° | 0.220 | 0.310 | 1.41 |
| Sample 1 (Silica-955 with nanoparticle coating) | 1.23 | 28.9° | 0.278 | 0.341 | 1.23 |
| Comparison Sample after calcination | | | 0.203 | 0.280 | 1.38 |
| Sample 2 (Silica-955 with nanoparticle coating and after calcinations) | | | 0.295 | 0.352 | 1.20 |

Further, the flowability of Sample 1 was measured after light agitation of the sample, e.g., tumbling the sample bottle, vigorously shaking the sample, tapping the sample bottle, and then flipping over and tapping again. In addition, the Sample 1 was kept in storage in the lab for more than 2.5 years before conducting the calcinations. These results suggest that the flowability improvement by the nano-coating may be permanent.

After coating a few weight percent of the nanoparticles, the cohesive solid catalyst, which was a Geldart's Group C powder, shows a much improved flowability, measured by a reduced Hausner Ratio and decreased angle of repose (AOR) Thus, the solid catalyst began to flow like a Geldart's Group A powder. The coating appears to be robust making the improvement of flowability sustainable through further operations.

The benefits of this technology include improved catalyst flow at a stable feed rate, accurate rate measurement, better feed control, and prevention of "hot spots" and agglomeration in fluidized-bed polyolefin reactors. The feeding of dry continuity additives or other additives could also be improved, because most of those dry additives are Geldart's Group C cohesive powders which have feed problems like those in the case of the dry catalysts.

While the foregoing is directed to embodiments of the present invention, other and further embodiments of the invention can be devised without departing from the basic scope thereof, and the scope thereof is determined by the claims that follow.

What is claimed is:

1. A polymerization process comprising contacting at least one monomer with:
    a polyolefin catalyst comprising a catalyst support, wherein the catalyst support has an average particle size of about 2 microns to about 200 microns, and a catalyst supported on the catalyst support; and
    nanoparticles adhered to the catalyst support, wherein the nanoparticles have an average particle size of about 2 to about 200 nanometers.

2. The polymerization process of claim 1, wherein the catalyst support comprises an inorganic oxide.

3. The polymerization process of claim 1, wherein the inorganic oxide comprises silica, alumina, zirconia, thoria, or any mixtures thereof.

4. The polymerization process of claim 1, wherein the nanoparticles comprise alumina, silica, titania, or any combinations thereof.

5. The polymerization process of claim 1, wherein the nanoparticles comprise carbon black, conductive nanoparticles, or any combinations thereof.

6. The polymerization process of claim 5, wherein the nanoparticles are selected from the group consisting of graphene nanoplatelets, graphite nanoparticles, Multi-Walled Carbon Nanotubes, and conductive standard carbon blacks.

7. The polymerization process of claim 1, wherein the nanoparticles comprise spheres, plates, fibers, or any agglomerations thereof, or any combinations thereof.

8. The polymerization process of claim 1, wherein the catalyst comprises a metallocene catalyst, a non-metallocene single-site catalyst, a Ziegler type catalyst, a chrome catalyst, or any combinations thereof.

* * * * *